Dec. 9, 1947.  M. G. MILLER  2,432,203
CATCH BASIN
Filed Aug. 11, 1945
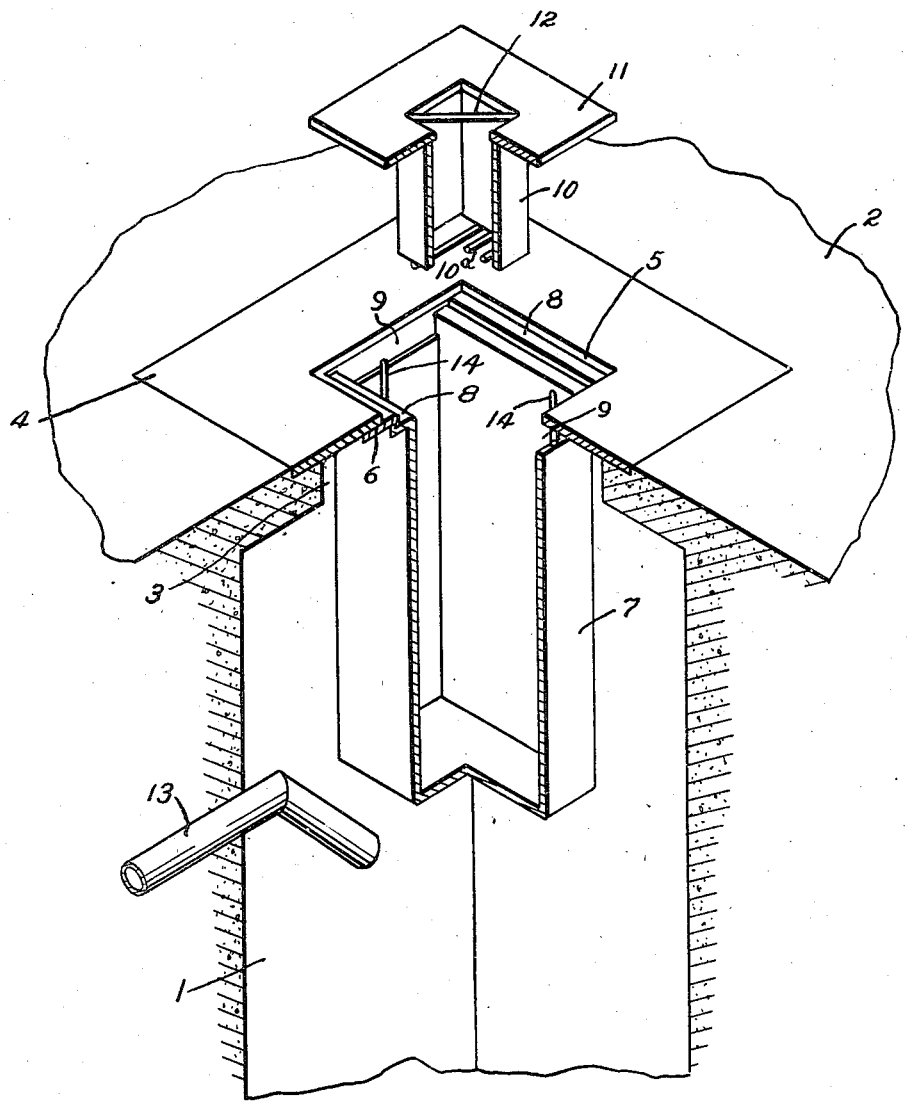
INVENTOR.
Melvin G. Miller
BY
E. V. Hardway
attorney Patented Dec. 9, 1947

2,432,203

UNITED STATES PATENT OFFICE 2,432,203

CATCH BASIN

Melvin G. Miller, Houston, Tex.

Application August 11, 1945, Serial No. 610,232

4 Claims. (Cl. 182—2)

1

This invention relates to a catch basin.

An object of the invention is to provide equipment of the character described specially designed for use in connection with filling station wash racks for catching the solid materials such as sand and refuse and trapping the same out of the liquid so as to prevent the main basin from becoming filled with the solid material so that the siphon pipe leading therefrom will not become clogged.

It is another object of the invention to provide a catch basin of the character described having a collecting pail suspended from the basin cover with a trap associated therewith and removable therefrom whereby the solid material is trapped out of the liquid and collected in the pail which may be easily removed from time to time and emptied.

With the above and other objects in view the invention has particular relation to certain novel features of construction, arrangement of parts and use, an example of which is given in this specification and illustrated in the accompanying drawing, wherein the figure is a perspective view, partly in section, of the catch basin showing the trap in withdrawn position.

Referring more particularly to the drawing, the numeral 1 designates the main basin which is preferably buried beneath the ground surface and is also preferably formed with concrete walls and bottom.

The numeral 2 designates the floor of the wash rack which has an opening 3 into the basin 1. A plate 4 is countersunk into the margin of the floor around the opening 3 and which is preferably formed of sheet metal. This plate 4 also has a central opening 5 which is preferably rectangular and welded to the under side of the plate 4, on opposite sides of the opening 5, there are the flanges 6 which extend entirely across the opening 5 and whose inner margins are downwardly offset.

The numeral 7 designates a pail which has the outwardly turned flanges 8, 8 at opposite sides which hang on the offset portions of the flanges 6.

The upper margins of the walls of the pail 7, between the flanges 8, do not extend up to the upper margins of the other walls of said pail thus providing the overflow spaces 9, 9.

The numeral 10 designates a trap which is preferably formed of four vertical walls and which is open at its upper and lower ends. The upper end of this trap has an outwardly extended flange 11 which fits closely in the opening

2

5 and which rests on the overturned flanges 8 of the pail so that the upper surface of the flange 11 will be flush with the upper surface of the cover plate 4.

The lower end of the trap 10 may be provided with coarse grating as 10a and the upper end of the trap has a cross bar 12 forming a grip member by means of which the trap may be removed.

When the trap is in position with its flanges 11 resting on the opposing flanges 8 of the pail the lower end of the trap will extend down into the pail.

During the washing process sand and other solid material will be washed down through the trap 10 with the washing fluid and will fall into the pail 7. Very coarse obstructing material will be arrested by the grating 10a and may be readily removed. The other solid material will collect in the pail 7 but the water or other washing fluid will overflow the pail passing out through the passageway 9, 9 into the main basin. No solid material will reach the main basin 1 and the fluid collecting therein will be siphoned off through the siphon pipe 13 which is connected with a sewage disposal line.

When the pail 7 becomes filled with solid material the trap 10 may be lifted off and the pail lifted out and emptied and replaced. The pail is provided with grip members 14, 14 for convenience in handling it.

The drawings and description are illustrative merely while the broad principle of the invention will be defined by the appended claims.

What I claim is:

1. In combination, a basin, a cover therefor having an opening, opposed flanges on the cover on opposite sides of the opening and which are downwardly offset, a pail having opposed outwardly turned flanges, forming hangers, which rest on the cover flanges to support the pail, the upper margin of one wall of the pail being spaced from the cover to provide an overflow passageway, a tubular trap whose upper end is provided with an external flange which fits into said opening and is supported by said flanges and whose lower end extends down into the pail and is spaced from the walls thereof.

2. In combination, a basin, a cover therefor having an opening, a pail, hangers on the pail engageable with the cover and suspending the paid underneath the cover with its upper margin spaced from the cover to provide a top overflow passageway, a tubular trap having an external top flange which is fitted in said opening and whose lower end extends down into the pail and is spaced from the walls thereof.

3. In combination, a basin, a cover therefor having an opening, opposed flanges on the cover on opposite sides of the opening and which are extended inwardly and downwardly offset, a pail having hangers formed with outwardly turned flanges which rest on the cover flanges to support the pail, the upper margin of one wall of the pail being spaced from the cover to provide an overflow passageway, a tubular trap whose upper end is provided with an external flange which fits into said opening and is supported by said cover flanges and whose lower end extends down into the pail and is spaced from the walls thereof.

4. The combination with a basin, of a cover countersunk into the top of the basin and having a central opening, a pair of flanges underneath the cover and secured thereto on opposite sides of the opening, said flanges projecting inwardly and extending entirely across the opening and having their inner margins downwardly offset, a pail having outwardly turned flanges at opposite sides which extend above the top of the pail and form hangers which engage said off-set portions of the flanges and whose upper surfaces are flush with the top of the flanges, the margins of the pail between said hangers being spaced below the cover to provide overflow spaces, a trap formed with vertical walls and open at its upper and lower ends, a flange which extends outwardly from the upper end of the trap and fits closely in said opening and which rests on the overturned flanges of the pail and on the flanges of said cover.

MELVIN G. MILLER.

REFERENCES CITED

The following references are of record in the file of this patent:

UNITED STATES PATENTS

| Number | Name | Date |
|---|---|---|
| 1,070,773 | Callahan | Aug. 19, 1913 |
| 1,982,348 | Luff | Nov. 27, 1934 |
| 2,101,978 | Boosey | Dec. 14, 1937 |